No. 686,625. Patented Nov. 12, 1901.
G. MACHLET, Jr.
BURNER.
(Application filed June 11, 1901.)
(No Model.)
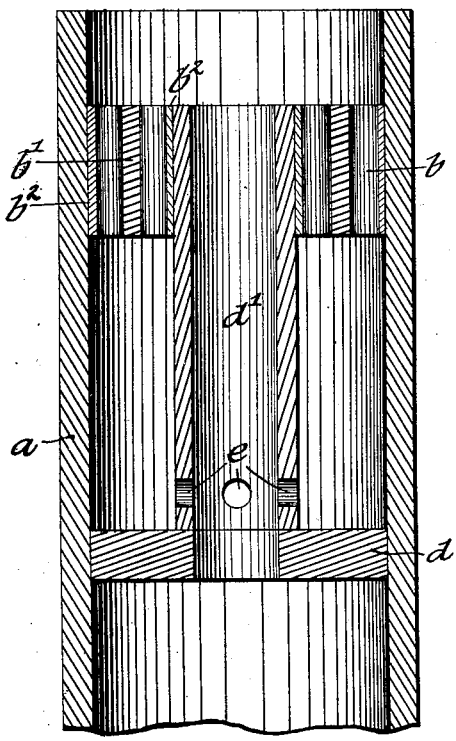
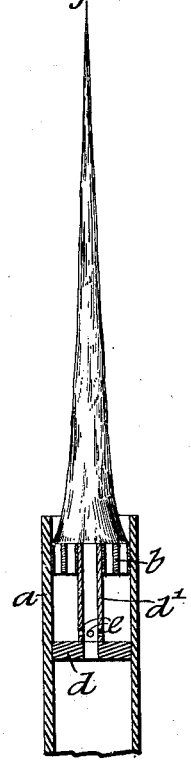
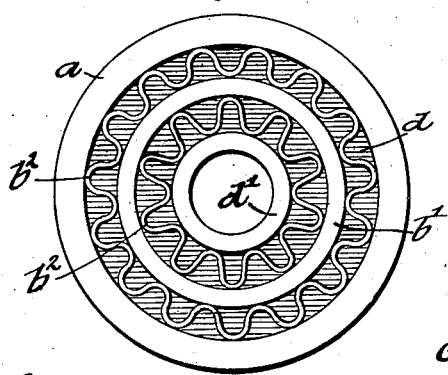
WITNESSES:
INVENTOR
George Machlet, jr.
BY
ATTORNEYS

UNITED STATES PATENT OFFICE.

GEORGE MACHLET, JR., OF ELIZABETH, NEW JERSEY.

BURNER.

SPECIFICATION forming part of Letters Patent No. 686,625, dated November 12, 1901.

Application filed June 11, 1901. Serial No. 64,116. (No model.)

*To all whom it may concern:*

Be it known that I, GEORGE MACHLET, Jr., a citizen of the United States, residing in Elizabeth, in the county of Union and State of New Jersey, have invented certain new and useful Improvements in Burners, of which the following is a specification.

This invention relates to improvements in burners; and the object of the invention is to provide an improved form of burner by which a thorough mixture of the air with the gas before combustion and then the burning of the mixture in a long and narrow flame can be produced. For this purpose the invention consists in the combination, with a burner-tube, of a screen supported in the same and composed of alternating plain and corrugated annular members, the upper surface of said screen being located below the edge of said burner-tube, a diaphragm in said tube below the screen, an opening in said diaphragm, and a smaller tube communicating with said opening and extending upwardly through the screen and provided with openings communicating with the space between said diaphragm and screen.

In the accompanying drawings, Figure 1 is a vertical section through my improved burner. Fig. 2 is a like view on a smaller scale and showing the flame, and Fig. 3 is a top view of the burner.

Similar letters of reference indicate corresponding parts.

Referring to the drawings, $a$ indicates the burner-tube. Within the burner-tube is retained, either frictionally or otherwise, a screen $b$, composed of alternating plain and corrugated annular members $b'$ $b^2$, said screen being located so that its upper surface is below the upper edge of the burner-tube, so that by the contraction of the flame thus produced the more perfect and complete combustion of the gas and air mixture is produced and the flame rendered steady. Within the burner-tube below the screen is located a diaphragm $d$, having an opening, and a smaller tube $d'$ extends from the diaphragm through the screen, preferably at the center of the same. The tube $d'$ communicates with the opening in the diaphragm and may be secured thereto in any suitable manner. The tube $d'$ is provided with a number of openings $e$ in its wall at a point between the screen and the diaphragm, so that the gas and air mixture entering said tube $d'$ divides, the greater part passing up the tube, while the smaller portion passes through the openings $e$ into the space below the screen, and thence upwardly through the screen, where it burns, together with that issuing from the tube. The result is a long narrow flame of intense heating power and admirably adapted for blowpipe-work.

Having thus described my invention, I claim as new and desire to secure by Letters Patent—

The combination, with a burner-tube, of a screen supported in the same and composed of alternating plain and corrugated annular members, the upper surface of said screen being located below the edge of said burner-tube, a diaphragm in said tube below the screen and provided with an opening, and a smaller tube communicating with said opening and extending upwardly from said diaphragm through the screen, and provided with openings communicating with the space between said diaphragm and screen, substantially as set forth.

In testimony that I claim the foregoing as my invention I have signed my name in presence of two subscribing witnesses.

GEORGE MACHLET, JR.

Witnesses:
    PAUL GOEPEL,
    GEORGE GEIBEL.